(12) United States Patent
Gould

(10) Patent No.: US 8,952,078 B2
(45) Date of Patent: Feb. 10, 2015

(54) PRINTING INK

(75) Inventor: Nigel Paul Gould, Broadstairs (GB)

(73) Assignee: Sericol Limited, Kent (GB)

( * ) Notice: Subject to any disclaimer, the term of this patent is extended or adjusted under 35 U.S.C. 154(b) by 427 days.

(21) Appl. No.: 12/307,539

(22) PCT Filed: Jul. 4, 2007

(86) PCT No.: PCT/GB2007/050378
§ 371 (c)(1),
(2), (4) Date: Mar. 30, 2009

(87) PCT Pub. No.: WO2008/004002
PCT Pub. Date: Jan. 10, 2008

(65) Prior Publication Data
US 2010/0272966 A1 Oct. 28, 2010

(30) Foreign Application Priority Data
Jul. 5, 2006 (GB) .................................... 0613583.4

(51) Int. Cl.
*C08F 4/46* (2006.01)
*C09D 11/00* (2014.01)
*C09D 11/04* (2006.01)
*C08J 3/28* (2006.01)
*C09D 11/101* (2014.01)

(52) U.S. Cl.
CPC ........... *C09D 11/101* (2013.01); *Y10S 522/909* (2013.01)
USPC ................. 522/144; 522/71; 522/74; 522/81; 522/113; 522/120; 522/114; 522/134; 522/135; 522/121; 522/149; 522/150; 522/153; 522/162; 522/165; 522/166; 522/168; 522/170; 522/909; 106/31.13; 106/31.6; 106/31.65; 106/31.85; 106/31.86; 427/508; 427/511; 427/514; 427/551; 427/372.2; 427/374.4; 427/384; 427/385.5

(58) Field of Classification Search
USPC .............. 522/71, 74, 81, 113, 120, 121, 114, 522/134, 135, 144, 149, 153, 162, 165, 166, 522/168, 170, 909, 150; 106/31.13, 31.6, 106/31.65, 31.85, 31.86; 523/160, 161; 427/508, 511, 514, 551, 372.2, 374.4, 427/384, 385.5
See application file for complete search history.

(56) References Cited

U.S. PATENT DOCUMENTS

| | | | |
|---|---|---|---|
| 5,854,300 A * | 12/1998 | Gould et al. ..................... | 522/85 |
| 7,285,160 B2 * | 10/2007 | Zhu et al. ..................... | 106/31.58 |
| 7,431,759 B2 * | 10/2008 | Sloan ........................ | 106/31.13 |
| 2003/0020282 A1 | 1/2003 | Biddings | |
| 2005/0140765 A1 | 6/2005 | Masumi et al. | |
| 2006/0052477 A1 * | 3/2006 | Kessel et al. .................. | 522/184 |
| 2006/0222831 A1 * | 10/2006 | Sloan ........................ | 428/195.1 |
| 2007/0247502 A1 * | 10/2007 | Grant et al. ..................... | 347/95 |

FOREIGN PATENT DOCUMENTS

| | | |
|---|---|---|
| EP | 1 006 161 A1 | 6/2000 |
| FR | 2 828 203 | 2/2003 |
| JP | 20040018546 | 1/2004 |
| JP | 2005060519 A | 3/2005 |
| JP | 2006002128 A | 1/2006 |
| JP | 20060028405 | 2/2006 |
| WO | 02 38688 A2 | 5/2002 |
| WO | 03/106143 | 12/2003 |
| WO | 2004 081125 A1 | 9/2004 |
| WO | 2006 041004 A1 | 4/2006 |
| WO | 2007062131 A2 | 5/2007 |
| WO | 2007083473 | 7/2007 |
| WO | 2007/089252 | 8/2007 |

OTHER PUBLICATIONS

Paraloid Acrylic Resins information sheet. [online], retrieved Dec. 20, 2010, retrived from URL:<http://www.kemcointernational.com/AcrylicResins.htm> Copyright 2000.*
Joncryl Polyols. Product Bulletin from BASF—The Chemical Company. [online]. Retreived on Jun. 30, 2011. Retrieved from URL:<http://www.micronal.de/portal/streamer?fid=465198>.*
Paraloid B-60 technical data sheet from DOW (Dec. 1996). [online]. retrived on Jun. 30, 2011. Retrieved from URL:<http://www.dow.com/assets/attachments/business/pcm/paraloid_b/paraloid_b-60/tds/paraloid_b-60.pdf>.*
Elvacite 2014. Acrylic Resin techincal data sheet from Lucite International, Inc (Sep. 2004). [online]. Retreived on Jun. 30, 2011. Retreived from URL:< http://www.lucitesolutions.com/remote/viewdocument.cfm?documentFile=E2014_09-04_EUR_copy1.pdf>.*
English translation of FR 2 828 203.
English translation of JP 2005-060519.

* cited by examiner

*Primary Examiner* — Sanza McClendon
(74) *Attorney, Agent, or Firm* — Wood, Phillips, Katz, Clark & Mortimer

(57) ABSTRACT

This invention relates to a printing ink and in particular to an ink for ink-jet printing which is cured by irradiation. The ink comprises at least one radiation-curable monomer; at least one passive thermoplastic resin; at least one radical photoinitiator; and at least one colouring agent; wherein the ink has a viscosity of less than 100 mPas at 25° C., and wherein the at least one passive resin is present at 2 to 15 wt % based on the total weight of the ink and has a molecular weight of 1,500 to 70,000.

18 Claims, No Drawings

PRINTING INK

This application is a U.S. National Stage filing under 35 U.S.C. §371 and 35 U.S.C. §119, based on and claiming priority to PCT/GB0007/050378 for "A PRINTING INK".

This invention relates to a printing ink and in particular to an ink for ink jet printing which is cured by irradiation.

In ink-jet printing, minute droplets of black, white or coloured ink are ejected in a controlled manner from one or more reservoirs or printing heads through narrow nozzles on to a substrate which is moving relative to the reservoirs. The ejected ink forms an image on the substrate. For high-speed printing, the inks must flow rapidly from the printing heads, and, to ensure that this happens, they must have in use a low viscosity, typically below 100 mPas at 25° C. although in most applications the viscosity should be below 50 mPas, and often below 25 mPas. Typically, when ejected through the nozzles, the ink has a viscosity of less than 25 mPas, preferably 5-15 mPas and ideally 10.5 mPas at the jetting temperature which is often elevated to about 40° C. (the ink might have a much higher viscosity at ambient temperature). The inks must also be resistant to drying or crusting in the reservoirs or nozzles. For these reasons, ink-jet inks for application at or near ambient temperatures are commonly formulated to contain a large proportion of a mobile liquid vehicle or solvent. In one common type of ink-jet ink this liquid is water—see for example the paper by Henry R. Kang in the Journal of Imaging Science, 35(3), pp. 179-188 (1991). In those systems, great effort must be made to ensure the inks do not dry in the head due to water evaporation. In another common type the liquid is a low-boiling solvent or mixture of solvents—see, for example, EP 0 314 403 and EP 0 424 714. Unfortunately, ink-jet inks that include a large proportion of water or solvent cannot be handled after printing until the inks have dried, either by evaporation of the solvent or its absorption into the substrate. This drying process is often slow and in many cases (for example, when printing on to a heat-sensitive substrate such as paper) cannot be accelerated.

Another type of ink-jet ink contains unsaturated organic compounds, termed monomers, which polymerise by irradiation, commonly with ultraviolet light, in the presence of a photoinitiator. This type of ink has the advantage that it is not necessary to evaporate the liquid phase to dry the print; instead the print is exposed to radiation to cure or harden it, a process which is more rapid than evaporation of solvent at moderate temperatures. In such ink-jet inks it is necessary to use monomers possessing a low viscosity.

However, ink-jet inks largely based on monomers suffer from significant draw-backs compared to ink-jet inks containing solvent or more traditional inks such as screen or flexographic systems, which allow greater formulation latitude.

The use of passive or inert resins to enhance adhesion of radiation cured coatings to plastics substrates is well known in screen-ink technology, in particular the use of thermoplastic acrylic resins is common to improve cure speed and adhesion. It is believed that they work in two ways; firstly improving wetting/affinity of the ink to the substrate, and secondly reducing the degree of UV crosslinking required to achieve a cured film by replacing the monomers and/or oligomers in the ink.

However, incorporating passive resins into ink-jet inks has traditionally been avoided because the high solution viscosity of many of these passive materials would preclude their use in ink-jet inks at sufficiently high addition levels to provide advantageous effects.

There is therefore a requirement in the art for inks which incorporate a passive resin in a sufficient quantity to obtain their beneficial properties without compromising the low viscosity of the ink-jet ink.

Accordingly, the present invention provides an ink-jet ink comprising at least one radiation-curable monomer; at least one passive thermoplastic resin; at least one radical photoinitiator; and at least one colouring agent; wherein the ink has a viscosity of less than 100 mPas at 25° C., and wherein the at least one passive resin is present at 2 to 15 wt % based on the total weight of the ink and has a molecular weight of 1,500 to 70,000.

The ink-jet ink of the present invention dries primarily by curing, i.e. by the polymerisation of the monomers present, as discussed hereinabove, and hence is a curable ink. The ink does not, therefore, require the presence of water or a volatile organic solvent to effect drying of the ink, although the presence of such components may be tolerated. Preferably, however, the ink-jet ink of the present invention is substantially free of water and volatile organic solvents.

The ink of the present invention is based on at least one radiation-curable monomer, typically a UV-curable monomer. Such components are well-known in the art. Preferably the monomer is monofunctional. By monofunctional is meant that the monomers have only one functional group which takes part in a polymerisation reaction during curing. A preferred example is a (meth)acrylate monomer. The preferred combination is a monofunctional (meth)acrylate as the reactive monomer.

Suitable monofunctional monomers include, phenoxyethyl acrylate (PEA), cyclic TMP formal acrylate (CTFA), isobornyl acrylate (IBOA), tetrahydrofurfuryl acrylate (THFA), 2-(2-ethoxyethoxy)ethyl acrylate, octa/decyl acrylate (ODA), tridecyl acrylate (TDA), isodecyl acrylate (IDA), lauryl acrylate or mixtures thereof.

Preferred monomers include N-vinyl caprolactam (NVC) and phenoxyethyl acrylate (PEA) or a mixture thereof:

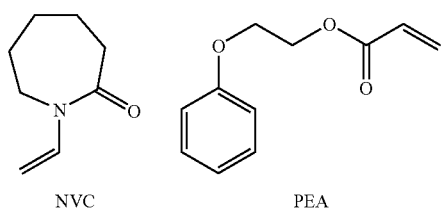

The monomer, e.g. monofunctional (meth)acrylate, is preferably present at 50 wt % or more, more preferably 60 wt % or more and most preferably 70 wt % or more, based on the total weight of the ink. The upper limit is preferably 95 wt % or less, more preferably 90 wt % or less and most preferably 85 wt % or less, based on the total weight of the ink.

The ink of the present invention also includes a passive (or "inert") thermoplastic resin. Passive resins are resins which do not enter into the curing process, i.e. the resin is substantially free of functional groups which polymerise under the curing conditions to which the ink is exposed.

Passive thermoplastic resins are known in the art. Examples of resins include resins selected from an acrylic resin, an epoxy resin, a ketone resin, a nitrocellulose resin, a phenoxy resin, a polyester resin, a PVC resin or a mixture thereof. Preferably the resin is an acrylic resin or a mixture of acrylic resins, such as a copolymer of methyl (meth)acrylate with butyl, isobutyl or isobornyl (meth)acrylate. A particularly preferred resin is Paraloid® DM 55 from Rohm and Haas which is a copolymer of methyl methacrylate and butyl acrylate having a molecular weight of 6000.

The passive thermoplastic resin is present in the ink at 2 to 15 wt % based on the total weight of the ink. The minimum amount is preferably 3 wt % or more, more preferably 4 wt % or more and most preferably 5 wt % or more; the maximum amount is preferably 12 wt % or less, more preferably 10 wt % or less and most preferably 8 wt % or less.

The passive thermoplastic resin has a weight-average molecular weight (Mw) of 1,500 to 70,000. Preferably the molecular weight is 2,000 or more, more preferably 3,000 or more, more preferably 4,000 or more and most preferably 5,000 or more; and 30,000 or less, more preferably 20,000 or less, more preferably 15,000 or less and most preferably 10,000 or less. The Mw may be measured by known techniques in the art, such a gel permeation chromatography (GPC).

A suitable GPC apparatus for measuring Mw is an LC instrument having the following parameters—Column set: MiniMix E or MiniMix D (depending on molecular weight), Eluent: THF, Detector: UV/vis and/or ELS, Calibration: conventional vs polystryrene. This approach is applicable to polymers having a Mw of 400-400,000.

As the molecular weight of the resin increases, the amount which may be incorporated into the ink formulation decreases. The amount by weight of the resin which is incorporated into the ink and the molecular weight of the resin is therefore balance depending on the precise balance of properties (cure speed, adhesion, substrate type, block resistance, film hardness/embattlement and product resistance) necessitated by the particular application. Most importantly, the amount and molecular weight is selected such that the viscosity of the ink is less than 100 mPas, more preferably 50 mPas or less, more preferably 30 mPas or less. The minimum viscosity is less important but the balance between the amount and the molecular weight of the resin is such that the viscosity is preferably 5 mPas or more, more preferably 10 mPas or more, more preferably 15 mPas or more and most preferably 20 mPas or more. The most preferred range is 20 to 30 mPas. A particular preferred combination is 4 to 10 wt % of a resin having a molecular weight of 5,000 to 10,000.

In a preferred embodiment, the ink of the present invention is used in the manufacture of a three-dimensional article, such as a face mask. Accordingly, the present invention provides a method of manufacturing a three-dimensional article comprising printing the ink-jet ink as claimed in any preceding claim on to a planar substrate, curing the ink, heating the substrate to a temperature above the glass transition temperature of the substrate, and vacuum forming the substrate to form the three-dimensional article. The vacuum forming technique is well-known in the art. As part of the technique, the substrate must be heated above its glass transition temperature. Cured oligomers typically present in inks tend to have a high glass transition temperature on account of the high degree of cross-linking.

Preferably therefore, the resin used in the present invention has a glass transition temperature of 20 to 150° C. More preferably the minimum is 30° C. or more, more preferably 40° C. or more and most preferably 45° C. or more; the maximum being 120° C. or less, more preferably 100° C. or less and most preferably 80° C. or less.

The resin also preferably has a melting point range falling within the range of 30 to 150° C. More preferably the melting point range starts at 40° C. or above, more preferably 50° C. or above and ends at 120° C. or below, more preferably 100° C. or below and most preferably 90° C. or below.

In addition to the monomers and resins described hereinabove, the ink of the present invention also includes a photoinitiator, which, under irradiation by, for example, ultraviolet light, initiates the polymerisation of the monomers. Preferred are photoinitiators which produce free radicals on irradiation (free radical photoinitiators) such as, for example, benzophenone, 1-hydroxycyclohexyl phenyl ketone, 2-benzyl-2-dimethylamino-(4-morpholinophenyl)butan-1-one, benzil dimethylketal, bis(2,6-dimethylbenzoyl)-2,4,4-trimethylpentylphosphine oxide or mixtures thereof. Such photoinitiators are known and commercially available such as, for example, under the trade names Irgacure, Darocur (from Ciba) and Lucerin (from BASF).

Preferably the photoinitiator is present from 1 to 20% by weight, preferably from 4 to 10% by weight, of the ink.

The ink-jet ink of the present invention also includes a colouring agent, which may be either dissolved or dispersed in the liquid medium of the ink. Preferably the colouring agent is a dispersible pigment, of the types known in the art and commercially available such as, for example, under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used.

The total proportion of pigment present is preferably from 0.5 to 15% by weight, more preferably from 1 to 5% by weight.

Although the ink of the present invention cures by a free radical mechanism, the ink of the present invention may also be a so-called "hybrid" ink which cures by a radical and cationic mechanism. The ink jet ink of the present invention, in one embodiment, therefore further comprises at least one cationically curable monomer, such as a vinyl ether, and at least one cationic photoinitiator, such as an iodonium or sulfonium salt, e.g. diphenyliodonium fluoride and triphenylsulfonium hexafluophosphate. Suitable cationic photoinitiators are be sold under the Trade names of Irgacure 184, Irgacure 500, Darocure 1173, Irgacure 907, ITX, Lucerin TPO, Irgacure 369, Irgacure 1700, Darocure 4265, Irgacure 651, Irgacure 819, Irgacure 1000, Irgacure 1300, Esacure KT046, Esacure KIP150, Esacure KT37, Esacure EDB, H-Nu 470 and H-Nu 470X.

In one embodiment the ink is substantially free of multifunctional monomers, meaning that only trace amounts will be present, for example as impurities in the monofunctional material or as a component in a commercially available pigment dispersion. Where multifunctional monomer is included, the multifunctional monomer is present in an amount of no more than 15 wt %, preferably no more than 10 wt %, more preferably no more than 5 wt % and most preferably no more than 2 wt % based on the total weight of the ink. The multifunctional monomer which is limited in amount may be any multifunctional monomer which could be involved in the curing reaction, such as a multifunctional (meth)acrylate monomer or a multifunctional vinyl ether.

Examples of the multifunctional acrylate monomers include hexanediol diacrylate, trimethylolpropane triacrylate, pentaerythritol triacrylate, polyethyleneglycol diacrylate, for example, tetraethyleneglycol diacrylate), dipropyleneglycol diacrylate, tri(propylene glycol) triacrylate, neopentylglycol diacrylate, bis(pentaerythritol) hexa-acrylate, and the acrylate esters of ethoxylated or propoxylated glycols and polyols, for example, propoxylated neopentyl glycol diacrylate, ethoxylated trimethylolpropane triacrylate, and mixtures thereof. Particularly preferred are difunctional acrylates with a molecular weight greater than 200. In addition, suitable multifunctional acrylate monomers include esters of methacrylic acid (i.e. methacrylates), such as hexanediol dimethacrylate, trimethylolpropane trimacrylate, triethyleneglycol dimethacrylate, diethyleneglycol dimethacrylate, ethyleneglycol dimethacrylate, 1,4-butanediol dimethacrylate. Mixtures of (meth)acrylates may also be used.

In an embodiment the ink is substantially free of radiation-curable oligomers meaning that only trace amounts will be present. Where oligomers are included, the oligomers are present in an amount of no more than 10 wt %, most preferably no more than 5 wt % based on the total weight of the ink. Oligomers (e.g. acrylate oligomers) are known in the art and typically have a molecular weight above 500, more preferably above 1000. Oligomers differ from the passive thermoplastic resin included in the ink of the present invention in that the oligomers take part in the curing reaction.

Other components of types known in the art may be present in the ink to improve the properties or performance. These components may be, for example, surfactants, defoamers, dispersants, synergists for the photoinitiator, stabilisers against deterioration by heat or light, reodorants, flow or slip aids, biocides and identifying tracers.

The present invention also provides a method of ink-jet printing using the above-described ink and a substrate having the cured ink thereon. Suitable substrates include PVC (e.g. BannerPVC), styrene, polyethylene terephthalate glycol modified (e.g. VIVAK), polycarbonate (e.g. PolyCarb), polypropylene (e.g. Correx), glass, metal and acrylic sheets. The ink of the present invention is preferably cured by ultraviolet irradiation and is suitable for application by ink-jet printing.

The ink-jet ink exhibits a desirable low viscosity, less than 100 mPas, preferably 50 mPas or less and most preferably 30 mPas or less at 25° C. The ink most preferably has a viscosity of 20 to 30 mPas at 25° C. Viscosity may be measured using a digital Brookfield viscometer fitted with a thermostatically controlled cup and spindle arrangement, such as model LDV1+.

(Meth)acrylate is intended herein to have its standard meaning, i.e. acrylate and/or methacrylate. Mono and multifunctional are also intended to have their standard meanings, i.e. one and two or more groups, respectively, which take part in the polymerisation reaction on curing.

The inks of the invention may be prepared by known methods such as, for example, stirring with a high-speed water-cooled stirrer, or milling on a horizontal bead-mill.

EXAMPLES

The invention will now be described, by way of example, with reference to the following examples (parts given are by weight).

Example 1

An ink-jet ink formulation based on NVC and PEA monomers was used to evaluate the selection of inert resins for their effect on cure speed, adhesion range, block resistance, film hardness/embrittlement resistance and product resistance. The ink-jet inks tested had a formulation as shown in Table 1.

TABLE 1

Formulation of ink-jet inks

| Component | Percentage in formula |
|---|---|
| Colour concentrate | 4.53 |
| Passive resin solution* | 81.86 |
| UV stabilizer | 0.8 |
| Irgacure 184 | 1.88 |
| Acyl phosphine oxide | 8.01 |
| Benzophenone | 2.82 |
| Silicone wetting agent | 0.1 |

*Dissolved in PEA/NVC at a ratio of 1.7 to 1.0 wt/wt and a solids content adjusted to give final ink viscosity of 20.0 to 30.0 mPas (cP).

Tables 2 and 3 set out the passive resins which were evaluated in the formulation given in Table 1.

TABLE 2

Evaluation of passive resins.

| Passive resin | Type | Composition | Glass transition temperature | Molecular weight (Mw) | Melting point range |
|---|---|---|---|---|---|
| Epikote 1001 | Bis phenol A epoxy | Bisphenol A and epichlorhydrin | 26° C. | 1,900 | 50-62° C. |
| Laropal A81 | Ketone resin | | 49° C. | n/a | 80-95° C. |
| AP resin | Ketone resin | acetophenone/formaldehye | 50° C. | n/a | 88-102° C. |
| Paraloid DM55 | Acrylic resin | MMA copolymer | 70° C. | 6,000 | n/a |
| Elvacite 4026 | Acrylate mod acrylic resin | MMA copolymer | 75° C. | 33,000 | n/a |
| Paraloid B66 | Acrylic resin | MMA/BMA | 50° C. | 70,000 | n/a |
| Dianal BR115 | Acrylic resin | iBMA | 55° C. | 55,000 | n/a |
| Adhesion resin LTH | Unsaturated polyester | | n/a | n/a | 90-102° C. |
| Dynapol L411 | Saturated polyester | | 47° C. | 16,000 | n/a |
| Dynapol L651 | Saturated polyester | | 40° C. | 15,000 | n/a |
| N/C chip H30 | Nitro cellulose | 80% Nitro cellulose (12.6% nitrogen) acetyl tributyl citrate | n/a | n/a | n/a |
| Uvicure P1000 | Phenoxy resin | Phenol, 4,4'-(1-methylethylidene) bispolymer with (chloromethyl) oxirane | 92° C. | 32,000 | n/a |
| Laroflex MP15 | PVC copolymer | PVC, vinyl isobutyl ether copolymer | n/a | 9,000 | 46-48° C. |
| Genomer 6083/M22 | Proprietary passive rein solution | Inert resin in monofunctional urethane acrylate monomer | n/a | n/a | n/a |

TABLE 3

Ink compositions.

| | A | B | C | D | E | F | G | H | I | J | K | L | M | N |
|---|---|---|---|---|---|---|---|---|---|---|---|---|---|---|
| Pigment concentrate | 4.53 | 4.53 | 4.53 | 4.53 | 4.53 | 4.53 | 4.53 | 4.53 | 4.53 | 4.53 | 4.53 | 4.53 | 4.53 | 4.53 |
| NVC | 27.86 | 26.36 | 26.36 | 26.36 | 29.00 | 29.33 | 29.26 | 28.4 | 29.33 | 29.41 | 29.56 | 29.56 | 29.14 | 26.36 |
| PEA | 48.0 | 45.5 | 45.5 | 45.5 | 50.06 | 50.53 | 50.4 | 48.46 | 50.53 | 50.65 | 50.9 | 50.9 | 50.32 | 45.5 |
| Epikote 1001 | 6.0 | | | | | | | | | | | | | |
| Laropal A81 | | 10.0 | | | | | | | | | | | | |
| AP resin | | | 10.0 | | | | | | | | | | | |
| Paraloid DM55 | | | | 10.0 | | | | | | | | | | |
| Elvacite 4026 | | | | | 2.8 | | | | | | | | | |
| Paraloid B66 | | | | | | 2.0 | | | | | | | | |
| Dianal BR115 | | | | | | | 2.2 | | | | | | | |
| Adhesion resin LTH | | | | | | | | 5.0 | | | | | | |
| Dynapol L411 | | | | | | | | | 2.0 | | | | | |
| Dynapol L651 | | | | | | | | | | 1.8 | | | | |
| N/C chip H30 | | | | | | | | | | | 1.4 | | | |
| Uvicure P1000 | | | | | | | | | | | | 1.4 | | |
| Laroflex MP15 | | | | | | | | | | | | | 2.4 | |
| Genomer 6083/M22* | | | | | | | | | | | | | | 10.0 |
| Stabiliser ST1 | 0.8 | 0.8 | 0.8 | 0.8 | 0.8 | 0.8 | 0.8 | 0.8 | 0.8 | 0.8 | 0.8 | 0.8 | 0.8 | 0.8 |
| Irgacure 184 | 1.88 | 1.88 | 1.88 | 1.88 | 1.88 | 1.88 | 1.88 | 1.88 | 1.88 | 1.88 | 1.88 | 1.88 | 1.88 | 1.88 |
| Acyl phosphine oxide | 8.01 | 8.01 | 8.01 | 8.01 | 8.01 | 8.01 | 8.01 | 8.01 | 8.01 | 8.01 | 8.01 | 8.01 | 8.01 | 8.01 |
| Benzophenone | 2.82 | 2.82 | 2.82 | 2.82 | 2.82 | 2.82 | 2.82 | 2.82 | 2.82 | 2.82 | 2.82 | 2.82 | 2.82 | 2.82 |
| Byk 037 | 0.1 | 0.1 | 0.1 | 0.1 | 0.1 | 0.1 | 0.1 | 0.1 | 0.1 | 0.1 | 0.1 | 0.1 | 0.1 | 0.1 |
| Viscosity (mPas) | 22.1 | 26.3 | 23.8 | 29.3 | 18.8 | 19.3 | 19.0 | 20.8 | 19.8 | 20.0 | 20.6 | 20.2 | 20.7 | 20.7 |

*Supplied 65% solids in Genomer 1122

Each of the above ink formulations was coated on to a range of substrates using a K bar coater (12 μm film). Cure speeds were evaluated using a Svecia drier fitted with two independently switchable 80 W/cm medium pressure mercury lamps. The prints were then evaluated for adhesion, block resistance, flexibility, Instron extensibility, vacuum forming and petrol/alcohol resistance. As a control a sample with no passive content was prepared. The results are set out in Table 4.

All the above properties were checked on 220 μm gloss PVC apart from the Instron testing where self-adhesive PVC film was used. Other than for the cure assessment all prints were cured at 15 m/min two lamps on full power (approx 600 mJ/cm²).

Results for cure dose are the number of mJ/cm² required to give a tack free film.

Block resistance is assessed in the following manner. Cured prints are placed in a stack, both face-to-face and face-to-back, and stored under a 20 Kg weight for 24 hours. After this period the degree of ink sticking and offsetting of the ink film is assessed. A score of 1 represents a poor result, with severe ink film removal, a score of 5 represents a perfect result with no marking or sticking occurring.

The result for flexibility/substrate embrittlement is a composite result of several tests. One, two and three layers of ink were applied to 220 μm gloss PVC and cured. Embrittlement is assessed by rolling the print into a tube with the ink side outer most. The tube is then struck across a sharp edge, such as a bench or table-top edge. The number of ink layers at which the ink film causes the substrate to break when stuck is observed. A mark of 5 represents no breakage at three layers, 1 represents severe shattering at one layer, intermediate marks are assigned in terms of the severity of embrittlement and the number of layers at which it occurred.

Two figures are quoted for Instron extensibility, the first is the extension in centimetres at which the substrate plus ink film breaks when stretched. The figure in parentheses is a mark from 1 to 5 for the effect on the ink film adhesion. A score of 1 represents a poor result, with severe breaking of the ink film and loss of adhesion, 5 represents a perfectly evenly elongated film with no loss of integrity or adhesion.

Petrol and alcohol resistance are both assessed by wiping the cured film with a soft cloth soaked in the solvent. The figures quoted are the number of double rubs required to break through the film and expose the substrate.

TABLE 4

Test results for the ink formulations.

| Passive resin | Cure dose (mJ/cm$^2$) | Block resistance | Flexibility/Embrittlement | Instron extensibility | Petrol resistance | Alcohol resistance (IPA) |
|---|---|---|---|---|---|---|
| Epikote 1001 | 260 | 2/3 | 2 | 148 (5) | 20 | 30 |
| Laropal A81 | 280 | 2 | 2/3 | 119 (5) | 10 | 15 |
| AP resin | 260 | 2/3 | 2/3 | 119 (5) | 20 | 30 |
| Paraloid DM55 | 180 | 2 | 4/5 | 111 (5) | 11 | 20 |
| Elvacite 4026 | 260 | 2 | 2 | 132 (5) | 23 | 24 |
| Paraloid B66 | 300 | 2 | 2/3 | 116 (5) | 18 | 23 |
| Dianal BR115 | 330 | 2/3 | 2/3 | 135 (5) | 21 | 24 |
| Adhesion resin LTH | 170 | 3 | 3 | 110 (5) | 23 | 50 |
| Dynapol L411 | 450 | 2/3 | 2/3 | 134 (5) | 25 | 27 |
| Dynapol L651 | 330 | 2/3 | 2/3 | 138 (5) | 16 | 25 |
| N/C chip H30 | 450 | 2/3 | 2 | 145 (5) | 27 | 48 |
| Uvicure P1000 | 300 | 2/3 | 2 | 147 (5) | 21 | 35 |
| Laroflex MP15 | 330 | 2 | 2/3 | 140 (5) | 17 | 30 |
| Genomer 6083/M22 | 330 | 2/3 | 2 | 136 (5) | 14 | 22 |
| Control no passive | 330 | 2/3 | 2 | 136 (5) | 20 | 40 |

All samples showed severe surface marking after only one double rub.

The adhesion was assessed on a selection of substrates and the results are set out in Table 5. All films were cured at 15 m/min 2×80 W/cm lamps on full power (approx 600 mJ/cm$^2$). Adhesion was ranked from 1 (very poor) to 5 (excellent). In each case the score is an amalgamation of results from scratch and cross hatch tape adhesion.

TABLE 5

Adhesion on a selection of substrates.

| Passive resin | 700 μm Gloss PVC | Matt styrene | Gloss styrene | Vivak | Polycarbonate | Correx | Glass | Metal | Acrylic sheet |
|---|---|---|---|---|---|---|---|---|---|
| Epikote 1001 | 3 | 5 | 5 | 5 | 4 | 2 | 5* | 4/5* | 4 |
| Laropal A81 | 3 | 4 | 4/5 | 5 | 4 | 2 | 5* | 4/5* | 4 |
| AP resin | 3 | 5 | 5 | 5 | 4 | 2 | 5* | 4 | 4 |
| Paraloid DM55 | 4/5 | 5 | 5 | 5 | 4 | 3/4* | 5* | 5* | 4 |
| Elvacite 4026 | 4/5 | 4/5 | 4/5 | 5 | 4 | 2 | 5* | 4/5* | 4 |
| Paraloid B66 | 3/4 | 5 | 5 | 5 | 4 | 2 | 3 | 4/5* | 4 |
| Dianal BR115 | 4/5 | 5 | 5 | 5 | 4 | 2 | 4/5* | 5* | 4 |
| Adhesion resin LTH | 4/5 | 4 | 5 | 5 | 4 | 2 | 2/3 | 5* | 4 |
| Dynapol L411 | 4/5 | 4 | 5 | 5 | 5* | 2 | 3/4* | 5* | 4 |
| Dynapol L651 | 4 | 5 | 4/5 | 5 | 5* | 2 | 3* | 4 | 4 |
| N/C chip H30 | 2/3 | 4 | 4 | 5 | 5* | 1 | 2 | 5* | 3 |
| Uvicure P1000 | 4 | 3/4 | 5 | 5 | 5* | 1 | 2 | 3 | 3 |
| Laroflex MP15 | 4/5 | 3/4 | 4 | 5 | 4/5* | 2/3* | 2 | 5* | 4 |
| Genomer 6083/M22 | 3 | 4 | 5 | 5 | 5* | 1 | 3* | 4 | 4 |
| Control (no passive) | 4 | 4/5 | 5 | 5 | 4 | 2 | 2 | 4 | 4 |

*Improvement in adhesion over non passive containing standard ink

Vacuum formability was checked as a single layer on Gloss styrene. All films were cured at 600 mJ/cm². The results are set out in Table 6. In the table, 1 represents poor formability with severe breaking of the film, 5 represents perfect vacuum formability with no cracking.

TABLE 6

Vacuum formability.

| Passive resin | Vacuum form |
|---|---|
| Epikote 1001 | 3 |
| Laropal A81 | 3 |
| AP resin | 3 |
| Paraloid DM55 | 3 (5*) |
| Elvacite 4026 | 3 |
| Paraloid B66 | 3 |
| Dianal BR115 | 3 |
| Adhesion resin LTH | 3 |
| Dynapol L411 | 3 |
| Dynapol L651 | 3 |
| N/C chip H30 | 3 |
| Uvicure P1000 | 3 |
| Laroflex MP15 | 3 |
| Genomer 6083/M22 | 3 |
| Control (no passive) | 3 |

*It was observed that the presence of propoxylated NPGDA which was present in the pigment dispersion (SM988) had adversely affected these results. The experiment using the Paraloid DM55-based ink was repeated as a clear ink with no pigment dispersion added. This gave a perfect vacuum forming result of 5.

A summary of the results obtained in this example are set out in Table 7.

TABLE 7

Summary of results (effect of addition of passive resin relative to passive free system)

| Passive resin | Addition rate | Cure speed | Adhesion | Flexibility |
|---|---|---|---|---|
| Epikote 1001 | 6.0 | ++ | + | = |
| Laropal A81 | 10 | ++ | + | = |
| AP resin | 10 | ++ | + | + |
| Paraloid DM55 | 10 | +++ | ++ | +++ |
| Elvacite 4026 | 2.8 | ++ | + | = |
| Paraloid B66 | 2.0 | + | + | + |
| Dianal BR115 | 2.2 | = | + | + |
| Adhesion resin LTH | 5.0 | +++ | + | ++ |
| Dynapol L411 | 2.0 | -- | + | + |
| Dynapol L651 | 1.8 | = | + | + |
| N/C chip H30 | 1.4 | -- | + | = |
| Uvicure P1000 | 1.4 | + | + | = |
| Laroflex MP15 | 2.4 | = | + | + |
| Genomer 6083/M22 | 10.0 | = | + | + |

Key
= equivalent performance to non passive containing system
-- worse performance
+ slightly improved performance
++ improved performance
+++ large improvement As can be seen from Table 7 the addition of passive resins to an ink-jet ink formulation offers significant advantages in cure response and adhesion range. Of the inks tested only inks containing Dynapol 411 and N/C chip H30 gave rise to any adverse effects at all (cure dose), but even these inks gave some benefits in adhesion.

The best range of properties was given by the ink containing Paraloid DM55, a methyl methacrylate copolymer having a molecular weight of 6000 and glass transition temperature of 70° C. Addition of this material at a 10% level to the test ink formulae gave a number of key performance improvements, namely an increase in cure response of 83%, significant improvements to the adhesion range, in particular to more difficult substrates such as glass, metal and polyolefin, and a reduction in substrate embrittlement, hence reducing the risks of shattering during post print finishing processes.

Example 2

In this example, further testing was performed in order to investigate the significance of the molecular weight of the passive resin. Table 8 sets out the maximum possible amount of different passive resins which may be incorporated into the ink formulation set out in Table 1 whilst maintaining an ink viscosity of below approximately 30 mPas at 25° C.

TABLE 8

Maximum level of incorporation of the passive resin.

| Resin | Maximum incorporation (wt %) | Finished Viscosity (mPas) | Chemical type | Composition | Glass transition temperature | Molecular weight |
|---|---|---|---|---|---|---|
| Paraloid DM55 | 10 | 29.3 | Acrylic resin | MMA copolymer | 70° C. | 6000 |
| Elvacite 4026 | 2.8 | 18.8 | Acrylate mod acrylic resin | MMA copolymer | 75° C. | 33,000 |
| Paraloid B66 | 2.0 | 19.3 | Acrylic resin | MMA/BMA | 50° C. | 70,000 |
| Dianal BR115 | 2.2 | 19.0 | Acrylic resin | iBMA | 55° C. | 55,000 |

To investigate this parameter further, inks were prepared using the above acrylic resins at a fixed level (7.0 wt %) regardless of the ink viscosity produced. It was found that the optimum viscosity of 22.0 mPas was achieved at a loading of 7.0% of Paraloid DM55.

Each of these inks was evaluated for cure response and adhesion range in the same manner as in Example 1, where 1=poor adhesion 5=excellent adhesion. The results are set out in Table 9.

TABLE 9

Adhesion on a range of substrates.

| Passive resin | 700 μm Gloss PVC | Matt styrene | Gloss styrene | Vivak | Polycarbonate | Correx | Glass | Metal | Acrylic sheet |
|---|---|---|---|---|---|---|---|---|---|
| Paraloid DM55 | 4/5 (4/5) | 5 (5) | 5 (5) | 5 (5) | 5 (4) | 3/4 (3/4) | 4 (5) | 4/5 (5) | 4 (4) |
| Elvacite 4026 | 5 (4/5) | 5 (4/5) | 5 (4/5) | 5 (5) | 5 (4) | 3/4 (2) | 4 (5) | 4/5 (4/5) | 5 (4) |
| Paraloid B66 | 5 (3/4) | 5 (5) | 5 (5) | 5 (5) | 5 (4) | 3/4 (2) | 4 (3) | 4 (4/5) | 4 (4) |
| Dianal BR115 | 4 (4/5) | 5 (5) | 5 (5) | 5 (5) | 5 (4) | 4 (2) | 4 (4/5) | 4/5 (5) | 4 (4) |

The first figure represents the results achieved at 7.0% resin loading. The figure in parentheses, for comparison, is the adhesion achieved previously at maximum loading possible whilst maintaining a viscosity of less than approximately 30 mPas.

As can be seen from Table 9, all of the acrylic resins evaluated gave similar adhesion characteristics when incorporated at equal loadings. In addition it was found that the cure response for the alternative acrylic resins had all increased to match that of the Paraloid DM55-based ink.

Example 3

To investigate further the effect of molecular weight of thermoplastic acrylic passive resins in UV ink-jet inks, a series of materials with similar chemical make up but with varying molecular weights were obtained, see Table 10.

TABLE 10

Mw of Elvacite resins

| Resin | Mw |
|---|---|
| Elvacite EDP636 | 13,000 |
| Elvacite 2927 | 20,000 |
| Elvacite 4111 | 34,000 |
| Elvacite 2934 | 44,000 |
| Elvacite 2823 | 55,000 |

Ink-jet inks based on these acrylic passive resins plus the Paraloid DM55 standard (Mw 6,000) were prepared according to the general formula set out in Table 11.

TABLE 11

Ink-jet ink formulation

| Component | Percentage in formula |
|---|---|
| Colour concentrate | 4.53 |
| Passive resin solution* | 81.86 |
| UV stabilizer | 0.8 |
| Irgacure 184 | 1.88 |
| Acyl phosphine oxide | 8.01 |

TABLE 11-continued

Ink-jet ink formulation

| Component | Percentage in formula |
|---|---|
| Benzophenone | 2.82 |
| Silicone wetting agent | 0.1 |

*Dissolved in PEA/NVC (ratio 1.7:1.0 by weight)

The solids content was adjusted to give a final ink viscosity of 20.0-24.0 mPas (centipoise) as set out in Table 12.

TABLE 12

Ink viscosity.

| Resin | Percentage incorporated | Finished ink viscosity (mPas) |
|---|---|---|
| Paraloid DM55 | 6.8 | 22.0 |
| Elvacite EDP636 | 4.4 | 21.1 |
| Elvacite 2927 | 3.9 | 21.2 |
| Elvacite 4111 | 2.9 | 20.0 |
| Elvacite 2934 | 2.9 | 22.0 |
| Elvacite 2823 | 2.9 | 23.6 |

Each of the inks was evaluated for cure response, blocking resistance, embrittlement resistance and adhesion range. In each case cyan inks were tested, using a K3 bar coater depositing approximately 12 μm. As before the general film properties were checked on 220 μm gloss PVC.

The blocking resistance, cure dose required to give tack free film and embrittlement resistance is set out in Table 13. In the case of blocking resistance and embrittlement resistance, 5=excellent result, 1=poor result.

TABLE 13

Test results for the ink formulations.

| Ink based on | Blocking result | Cure dose (mJ/cm$^2$) | Embrittlement |
|---|---|---|---|
| Paraloid DM55 | 3 (slight marking) | 148 | 3 |
| Elvacite EDP636 | 3 (slight marking) | 148 | 2 |
| Elvacite 2927 | 3 (slight marking) | 170 | 1/2 |
| Elvacite 4111 | 3 (slight marking) | 170 | 1/2 |
| Elvacite 2934 | 3 (slight marking) | 190 | 1 |
| Elvacite 2823 | 3 (slight marking) | 190 | 1 |

Each of these inks was evaluated for cure response and adhesion range in the same manner as in Examples 1 and 2, where 1=poor adhesion 5=excellent adhesion. The results are set out in Table 14. The molecular weight of the resins increases going down the table from the first to the last entry in the table.

TABLE 14

Adhesion on a range of substrates.

| Passive resin | 700 μm Gloss PVC | Matt styrene | Gloss styrene | Vivak | Poly-Carbon-ate | Acrylic sheet | Metal | Glass | Correx (PP) |
|---|---|---|---|---|---|---|---|---|---|
| Paraloid DM55 | 5 | 4/5 | 4/5 | 4 | 5 | 4 | 5 | 5 | 3/4 |
| Elvacite EDP636 | 5 | 4/5 | 4/5 | 4 | 5 | 5 | 4 | 4/5 | 2* |
| Elvacite 2927 | 5 | 4 | 5 | 3/4 | 5 | 5 | 5 | 5 | 2* |
| Evacite 4111 | 5 | 4 | 5 | 4 | 5 | 4 | 4 | 3/4* | 1/2* |
| Elvacite 2934 | 5 | 4 | 4 | 3/4 | 5 | 5 | 4 | 3* | 1/2* |
| Elvacite 2823 | 5 | 4 | 5 | 4 | 4/5 | 4 | 5 | 1* | 1/2* |

*Poorer adhesion

The results set out in Table 14 show that as the molecular weight (Mw) of the acrylic resins increases, and hence the amount of the resin that can be incorporated into the ink whilst maintaining the target viscosity range decreases, some of the film properties are adversely affected.

Embrittlement resistance of the cured ink films become worse as the molecular weight of the resin increases, this is probably due to the higher double bond content of the compositions that contain lower amounts of the passive or inert resin. Cure speed of the inks also show a similar trend.

There is also a clear affect on adhesion, as the molecular weight of the resin increases and hence the amount in the formula decreases. Acceptable adhesion to polypropylene (Correx) is significantly reduced once the molecular weight increases above Mw 6,000. Once the molecular weight increases above Mw 34,000 adhesion to glass is reduced, this continues as the molecular weight increases to Mw 55,000 where the adhesion is very poor.

The invention claimed is:

1. An ink-jet ink substantially free of water and volatile organic solvents consisting essentially of at least one radiation-curable monomer, wherein the radiation-curable monomer is a monofunctional monomer and the ink contains no more than 15 wt % of multifunctional monomers based on the total weight of the ink; at least one passive thermoplastic resin; 4-10% by weight of at least one radical photoinitiator based on the weight of the ink; and at least one dispersible pigment; wherein the ink has a viscosity of less than 100 mPas at 25° C., wherein the at least one passive resin is present at 2 to 15 wt % based on the total weight of the ink and has a weight-average molecular weight of 1,500 to 70,000.

2. An ink-jet ink as claimed in claim 1, wherein the radiation-curable monomer is a (meth)acrylate monomer.

3. An ink-jet ink as claimed in claim 1, wherein the at least one passive resin is present in an amount of from 3 to 10 wt % based on the total weight of the ink.

4. An ink-jet ink as claimed in claim 1, wherein the at least one passive resin has a weight-average molecular weight of 2,000 to 30,000.

5. An ink-jet ink as claimed in claim 1 wherein the at least one passive resin has a glass transition temperature of 20 to 150° C.

6. An ink-jet ink as claimed in claim 1, wherein the at least one passive resin has a melting point range falling within the range of 30 to 150° C.

7. An ink-jet ink as claimed in claim 1, wherein the at least one passive resin is selected from an acrylic resin, an epoxy resin, a ketone resin, a nitrocellulose resin, a phenoxy resin, a polyester resin, a PVC resin or a mixture thereof.

8. An ink-jet ink as claimed in claim 7, wherein the at least one passive resin is an acrylic resin or a mixture of acrylic resins.

9. An ink-jet ink as claimed in claim 8, wherein the at least one passive resin is a methyl methacrylate-butyl acrylate copolymer having a weight-average molecular weight of 5000 to 7000.

10. An ink-jet ink as claimed in claim 1, wherein the ink is substantially free of a multifunctional monomer.

11. An ink-jet ink as claimed in claim 1, wherein the ink contains no more than 10 wt % of an oligomers based on the total weight of the ink.

12. An ink-jet ink as claimed in claim 11, wherein the ink is substantially free of an oligomer.

13. An ink-jet ink as claimed in claim 3, wherein the at least one mono functional (meth)acrylate monomer is selected from phenoxyethyl acrylate (PEA), cyclic TMP formal acrylate (CTFA), isobornyl acrylate (IBOA), tetrahydrofurfuryl (THFA), 2-(2-ethoxyethoxy)ethyl acrylate, octa/decyl acrylate (ODA), tridecyl acrylate (TDA), isodecyl acrylate (IDA), lauryl acrylate and mixtures thereof.

14. A method of ink-jet printing, comprising printing the ink-jet ink as claimed in claim 1 on to a substrate and curing the ink.

15. A method of manufacturing a three-dimensional article comprising printing the ink-jet as claimed in claim 1 on to a planar substrate, curing the ink, heating the substrate to a temperature above the glass transition temperature of the substrate, and vacuum forming the substrate to form the three-dimensional article.

16. A substrate having the ink-jet ink as claimed in claim 1 printed thereon.

17. An ink-jet ink consisting essentially of at least one radiation-curable monomer, wherein the radiation-curable monomer is a monofunctional monomer and the ink contains no more than 15 wt % of multifunctional monomers based on the total weight of the ink; at least one passive thermoplastic resin; 4-10% by weight of at least one radical photoinitiator based on the weight of the ink; and at least one dispersible pigment; wherein the ink has a viscosity of less than 100 mPas at 25 ° C., wherein said ink-jet ink is substantially free of water and volatile organic solvents, wherein the at least one passive resin is present at 2 to 15 wt % based on the total weight of the ink and has a weight-average molecular weight of 2,000 to 30,000, and wherein said ink-jet ink is suitable for vacuum forming applications.

18. A method of manufacturing a three-dimensional article comprising printing an ink-jet ink on to a planar substrate, curing the ink, heating the substrate to a temperature above the glass transition temperature of the substrate, and vacuum forming the substrate to form the three-dimensional article, said ink-jet ink consisting essentially of at least one radiation-curable monomer, wherein the radiation-curable monomer is a monofunctional monomer and the ink contains no more than 15 wt % of multifunctional monomers based on the total weight of the ink; at least one passive thermoplastic resin; 4-10% by weight of at least one radical photoinitiator based on the weight of the ink; and at least one dispersible pigment; wherein the ink has a viscosity of less than 100 mPas at 25 °C., wherein said ink-jet ink is substantially free of water and volatile organic solvents, wherein the at least one passive resin is present at 2 to 15 wt % based on the total weight of the ink and has a weight-average molecular weight of 1,500 to 70,000, and wherein said ink-jet ink is suitable for vacuum forming applications.

* * * * *